United States Patent
Iwamoto et al.

(10) Patent No.: US 9,302,216 B2
(45) Date of Patent: Apr. 5, 2016

(54) CARBON DIOXIDE GAS FIXATION METHOD AND CARBON DIOXIDE GAS FIXATION APPARATUS

(75) Inventors: Tatsushi Iwamoto, Yokohama (JP); Kenichi Akamine, Tokyo (JP); Junichi Okuyama, Yokohama (JP)

(73) Assignee: IHI CORPORATION (JP)

( * ) Notice: Subject to any disclaimer, the term of this patent is extended or adjusted under 35 U.S.C. 154(b) by 139 days.

(21) Appl. No.: 13/817,984

(22) PCT Filed: Aug. 30, 2011

(86) PCT No.: PCT/JP2011/069560
§ 371 (c)(1),
(2), (4) Date: Mar. 4, 2013

(87) PCT Pub. No.: WO2012/029757
PCT Pub. Date: Mar. 8, 2012

(65) Prior Publication Data
US 2013/0180400 A1    Jul. 18, 2013

(30) Foreign Application Priority Data

Aug. 31, 2010  (JP) ................................. 2010-193816

(51) Int. Cl.
*B01D 53/14* (2006.01)
*B01D 53/62* (2006.01)
(Continued)

(52) U.S. Cl.
CPC ............... *B01D 53/14* (2013.01); *B01D 53/62* (2013.01); *C01B 31/24* (2013.01); *C01F 11/18* (2013.01); *C25B 9/08* (2013.01); *B01D 53/965* (2013.01); *B01D 2251/304* (2013.01); *B01D 2252/1035* (2013.01); *B01D 2257/504* (2013.01);
(Continued)

(58) Field of Classification Search
None
See application file for complete search history.

(56) References Cited

U.S. PATENT DOCUMENTS

| 5,891,320 A | 4/1999 | Wurzburger et al. ......... 205/508 |
| 6,045,684 A * | 4/2000 | Wakita et al. .................. 205/466 |

(Continued)

FOREIGN PATENT DOCUMENTS

| JP | 51-077586 | 7/1976 |
| JP | 52-115553 | 9/1977 |

(Continued)

OTHER PUBLICATIONS

Translation of JP 2004089770 A Accessed Jan. 16, 2015.*
(Continued)

*Primary Examiner* — Duane Smith
*Assistant Examiner* — Phillip Shao
(74) *Attorney, Agent, or Firm* — Ostrolenk Faber LLP

(57) ABSTRACT

In the carbon dioxide gas fixation method and carbon dioxide gas fixation apparatus, seawater (7) is electrolyzed, anodic electrolyzed water (7a) and cathodic electrolyzed water (7b) produced by electrolysis of the seawater are separated, alkaline material is inputted into the anodic electrolyzed water to adjust pH, carbon dioxide gas is blown into the cathodic electrolyzed water to fix the carbon dioxide gas as carbonate, and the anodic electrolyzed water after pH adjustment and the cathodic electrolyzed water after carbonate fixation are intermixed, and discharged in a state where a pH of the intermixed water is identical to a pH of the seawater. As a result, it is possible to offer a carbon dioxide gas fixation method and a carbon dioxide gas fixation apparatus which fix carbon dioxide gas with little impact on the environment, and without risk of re-release.

4 Claims, 4 Drawing Sheets

(51) Int. Cl.
*C01B 31/24* (2006.01)
*C01F 11/18* (2006.01)
*C25B 9/08* (2006.01)
*B01D 53/96* (2006.01)
*C02F 1/461* (2006.01)
*C02F 103/08* (2006.01)
*C02F 1/66* (2006.01)

(52) U.S. Cl.
CPC ............... *C02F1/46104* (2013.01); *C02F 1/66* (2013.01); *C02F 2103/08* (2013.01); *C02F 2201/46165* (2013.01); *Y02C 10/04* (2013.01); *Y02P 20/152* (2015.11); *Y02W 10/37* (2015.05)

(56) References Cited

U.S. PATENT DOCUMENTS

| | | | |
|---|---|---|---|
| 6,190,530 B1 | 2/2001 | Brodsky et al. | 205/147 |
| 6,375,825 B1 | 4/2002 | Mauldin et al. | 205/508 |
| 2002/0177021 A1* | 11/2002 | Fuglevand | 429/23 |
| 2009/0038955 A1 | 2/2009 | Rau | 205/508 |
| 2009/0294366 A1* | 12/2009 | Wright et al. | 210/683 |
| 2011/0300043 A1* | 12/2011 | Sano et al. | 423/220 |
| 2012/0100444 A1* | 4/2012 | Lee et al. | 429/411 |

FOREIGN PATENT DOCUMENTS

| | | |
|---|---|---|
| JP | 60-000887 | 1/1985 |
| JP | 61-177385 | 8/1986 |
| JP | 4-325391 | 11/1992 |
| JP | 6-239681 | 8/1994 |
| JP | 9-028234 | 2/1997 |
| JP | 2001-059472 | 3/2001 |
| JP | 2003-326155 | 11/2003 |
| JP | 2004-089770 | 3/2004 |
| JP | 2004089770 A * | 3/2004 |
| JP | 2005-058955 | 3/2005 |
| JP | 2005-262158 | 9/2005 |
| JP | 2005-334694 | 12/2005 |
| JP | 2007-098352 | 4/2007 |
| JP | 2007-167786 | 7/2007 |
| JP | 2009-502483 | 1/2009 |
| JP | 2009-183906 | 8/2009 |
| JP | 2009262124 A * | 11/2009 |
| WO | WO 2007/016271 | 2/2007 |

OTHER PUBLICATIONS

Translation of JP 2009262124 A Accessed Jan. 16, 2015.*
Kobya, Mehmet, Treatment of textile wastewaters by electrocoagulation using iron and aluminum electrodes, Jun. 27, 2003, Journal of Hazardous Materials, vol. 100, issues 1-3, pp. 163-178 Accessed Jul. 20, 2015.*
International Search Report and Written Opinion mailed Oct. 11, 2011 in corresponding PCT International Application No. PCT/JP2011/070236.
U.S. Requirement for Restriction/Election dated Dec. 1, 2014 issued in U.S. Appl. No. 13/820,630.
U.S. Office Action dated Feb. 19, 2015 issued in U.S. Appl. No. 13/820,630.
Japanese Office Action dated Mar. 3, 2015 issued in Japanese Application No. 2010-203353 with English translation.
Office Action dated Nov. 17, 2015 issued in corresponding U.S. Appl. No. 13/820,630.

* cited by examiner

CARBON DIOXIDE GAS FIXATION METHOD AND CARBON DIOXIDE GAS FIXATION APPARATUS

CROSS-REFERENCE TO RELATED APPLICATIONS

The present application is a 35 U.S.C. §§371 national phase conversion of PCT/JP2011/069560, filed Aug. 30, 2011, which claims priority of Japanese Patent Application No. 2010-193816, filed Aug. 31, 2010, the contents of which are incorporated herein by reference. The PCT International Application was published in the Japanese language.

TECHNICAL FIELD

The present invention relates to carbon dioxide gas fixation method and apparatus which fix carbon dioxide gas by producing an alkaline solution from electrolysis of seawater, absorbing carbon dioxide gas into the seawater, and converting it to calcium carbonate.

BACKGROUND ART

Carbon dioxide gas has been cited as one factor in global warming, and emissions of carbon dioxide gas have increased in conjunction with economic growth. Accordingly, there is a serious need for reducing the atmospheric concentration of carbon dioxide gas on a global scale.

Conventionally, as carbon dioxide gas fixation methods, there has been proposal of a method in which carbon dioxide gas is absorbed by an alkaline solution such as amine, and is separated and recovered by heating; or a method in which carbon dioxide gas that has been separated and recovered using a porous gas permeation membrane is liquefied, and stored in the deep ocean or underground. However, the foregoing methods not only impose environmental burdens, but also involve possibility of re-release of the carbon dioxide gas stored in the ocean or underground.

As another carbon dioxide gas fixation method, there is a method shown in Patent Document 1.

CITATION LIST

Patent Document

Patent Document 1: Japanese Unexamined Patent Application, First Publication No. 2003-326155

SUMMARY OF INVENTION

Technical Problem

In light of the foregoing circumstances, the present invention offers carbon dioxide gas fixation method and carbon dioxide gas fixation apparatus which fix carbon dioxide gas with little environmental impact, and with no possibility of re-release.

Solution to Problem

The present invention pertains to a carbon dioxide gas fixation method including: electrolyzing seawater; separating anodic electrolyzed water and cathodic electrolyzed water produced by electrolysis of the seawater; inputting alkaline material into the anodic electrolyzed water to adjust pH; blowing carbon dioxide gas into the cathodic electrolyzed water to fix the carbon dioxide gas as carbonate; and intermixing the anodic electrolyzed water after pH adjustment and the cathodic electrolyzed water after carbonate fixation and discharging the intermixed water in a state where a pH of the intermixed water is identical to a pH of the seawater.

In this case, the alkaline material may be waste concrete.

Iron, which is a soluble metal, may be used in an anode-side electrode to cause dissolution of ferric ions in the anodic electrolyzed water in the seawater electrolysis process.

In addition, the present invention pertains to a carbon dioxide gas fixation apparatus, including: an electrolysis tank which has an anode and a cathode; a barrier membrane which partitions an interior of the electrolysis tank into an anode-side region containing the anode, and a cathode-side region containing the cathode; a first treatment tank which stores anodic electrolyzed water produced in the anode-side region; a second treatment tank which stores cathodic electrolyzed water produced in the cathode-side region; a power-supply unit which supplies power to the anode and the cathode; an alkaline material input device which inputs alkaline material into the first treatment tank; and a carbon dioxide gas blower which blows carbon dioxide gas into the second treatment tank, in which wastewater from the first treatment tank and wastewater from the second treatment tank are intermixed, and discharged.

In this case, the power-supply unit may have at least one of photovoltaic cell, fuel cell, wind power generator, wave power generator, ocean thermal energy generator, and solar thermal power generator.

The power-supply unit may contain a fuel cell which uses hydrogen gas generated on the cathode-side region, and oxygen gas generated on the anode-side region.

The alkaline material inputted from the alkaline material input device may be waste concrete.

The anode preferably may contain iron as a consumable electrode, and the consumable electrode may dissolve ferric ions.

Advantageous Effects of Invention

With the carbon dioxide gas fixation method of the present invention, seawater is electrolyzed, anodic electrolyzed water and cathodic electrolyzed water produced by the electrolysis of the seawater are separated, alkaline material is inputted into the anodic electrolyzed water to adjust pH, carbon dioxide gas is blown into the cathodic electrolyzed water to fix the carbon dioxide gas as carbonate, and the anodic electrolyzed water after pH adjustment and the cathodic electrolyzed water after carbonate fixation are intermixed, and discharged with a pH identical to that of seawater. Consequently, it is possible to fix carbon dioxide gas without impact on the environment.

In the carbon dioxide gas fixation method of the present invention, it is possible to concomitantly perform treatment of industrial waste products when using waste concrete as the alkaline material.

In the carbon dioxide gas fixation method of the present invention, when using iron, which is a soluble metal, in the anode-side electrode, ferric ions are dissolved in the anodic electrolyzed water in the seawater electrolysis process, and ferric ions that are a nutrient of phytoplankton are supplied into the seawater. As a result, propagation of phytoplankton is promoted, achieving fixation of carbon dioxide gas by phytoplankton.

According to the carbon dioxide gas fixation apparatus of the present invention, there is provided: an electrolysis tank which has an anode and a cathode; a barrier membrane which partitions an interior of the electrolysis tank into an anode-side region containing the anode, and a cathode-side region containing the cathode; a first treatment tank which stores anodic electrolyzed water produced in the anode-side region; a second treatment tank which stores cathodic electrolyzed water produced in the cathode-side region; a power-supply unit which supplies power to the anode and the cathode; an alkaline material input device which inputs alkaline material into the first treatment tank; and a carbon dioxide gas blower which blows carbon dioxide gas into the second treatment tank, in which wastewater from the first treatment tank and wastewater from the second treatment tank are intermixed, and discharged. Consequently, it is possible to fix carbon dioxide gas without impact on the environment.

In the carbon dioxide gas fixation apparatus of the present invention, when the power-supply unit has at least one photovoltaic cell, fuel cell, wind power generator, wave power generator, ocean thermal energy generator, or solar thermal power generator, power is supplied by utilizing natural energy, or by using energy that does not produce carbon dioxide gas. Consequently, it is possible to fix carbon dioxide gas without impact on the environment.

In the carbon dioxide gas fixation apparatus of the present invention, when the power-supply unit contains a fuel cell which uses hydrogen gas generated on the cathode side, and oxygen gas generated on the anode side, a portion of the power expended in seawater electrolysis is again used in seawater electrolysis. Consequently, energy conservation is achieved.

In the carbon dioxide gas fixation apparatus of the present invention, when the alkaline material inputted from the alkaline material input device is waste concrete, treatment of waste concrete which is an industrial waste product can be concomitantly performed.

In the carbon dioxide gas fixation apparatus of the present invention, when the anode includes iron as a consumable electrode, the consumable electrode dissolves ferric ions, thereby supplying the ocean with ferric ions, which are a nutrient of phytoplankton. As a result, the excellent effects are obtained that propagation of phytoplankton is promoted, and fixation of carbon dioxide gas by phytoplankton is achieved.

DESCRIPTION OF EMBODIMENTS

Embodiments of the present invention are described below with reference to drawings.

Figure 1:
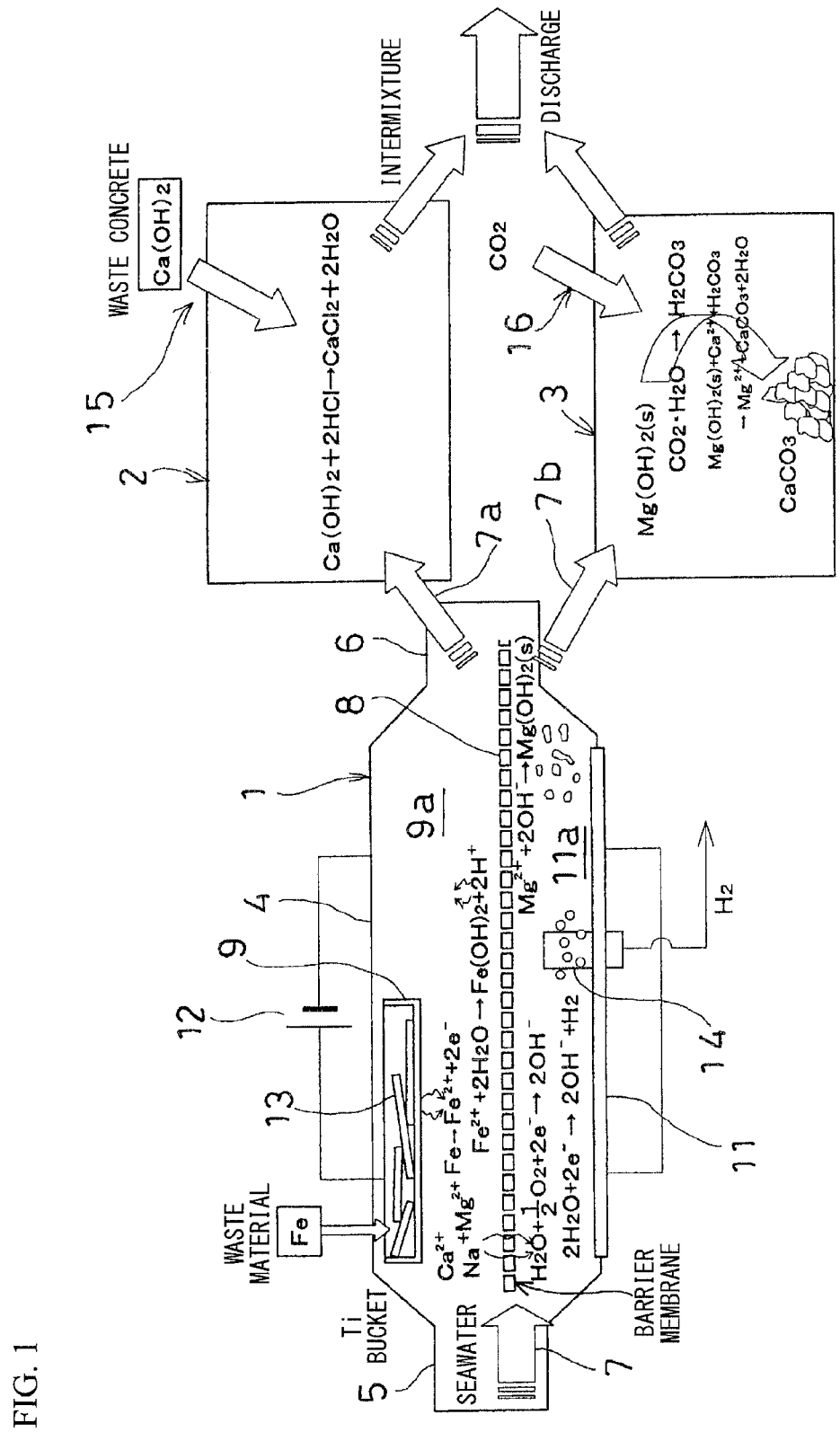
FIG. 1 is a schematic view of an embodiment of the present invention.

First, the principles of an embodiment of the present invention are described in FIG. 1.

In FIG. 1, 1 indicates an electrolysis tank, 2 indicates a first treatment tank, and 3 indicates a second treatment tank.

The electrolysis tank 1 has an electrolytic treatment container 4 made of corrosion-resistant material such as stainless steel, and the electrolytic treatment container 4 has an inlet 5 at the upstream end, and an outlet 6 at the downstream end. Seawater 7, which flows in from the inlet 5, runs uniformly through the interior of the electrolytic treatment container 4, and is discharged from the outlet 6.

Various methods may be adopted as a method of forming the flow of the seawater 7. For example, the electrolytic treatment container 4 may be submerged in water to utilize ocean current, and have the seawater 7 flow through the interior of the electrolytic treatment container 4; or a screw or the like may be provided in the inlet 5 to create water flow by rotating this screw by a motor; or the seawater 7 may be taken in by a pump or the like, and supplied to the inlet 5.

A barrier membrane 8 is provided inside the electrolytic treatment container 4 in the flow direction of the seawater. The barrier membrane 8 partitions the interior of the electrolytic treatment container 4 in two, with the result that a flow of the seawater 7 separated by the barrier membrane 8 is formed inside the electrolytic treatment container 4.

The barrier membrane 8 uses a material and structure through which electric current passes and which prevent or inhibit intermixture of the separated streams. For example, one may use unglazed plates in tile form laid out in rows, or porous sheets or the like made of synthetic resin.

In the case where the interior of the electrolytic treatment container 4 is partitioned by the barrier membrane 8, various formats are conceivable such as vertical partitioning, lateral partitioning, and concentric partitioning, but the following is a description of the case where the interior of the electrolytic treatment container 4 is vertically partitioned by the barrier membrane 8.

A positive electrode (anode) 9 is provided along the upper wall surface of the electrolytic treatment container 4, a negative electrode (cathode) 11 is provided along the lower wall surface, and the anode 9 and the cathode 11 are respectively connected to a positive pole and negative pole of a power-supply unit 12. Accordingly, an anode-side region 9a and cathode-side region 11a are formed within the electrolytic treatment container 4 by partitioning of the interior of the electrolytic treatment container 4 by the barrier membrane 8.

The power-supply unit 12 uses either power generation utilizing natural energy such as photovoltaic power generation, wind power generation, wave power generation, ocean thermal energy generation, and solar thermal power generation, or a fuel cell (described below), or uses a composite device composed of two or more of these. Furthermore, in the case where power is supplied from an electric power plant, it is also acceptable to utilize nighttime surplus power.

As the anode 9, an anode is used in which a soluble metal is inputted as a consumable electrode material 13 into a bucket (consumable electrode storage container) of reticular or porous plates of an insoluble metal such as titanium. Iron is preferable as the inputted consumable electrode material 13. Not only is iron easy to obtain as waste material, but the ferric ions that dissolve serve as nutrients for propagation of phytoplankton. As a result, phytoplankton is propagated by supplying ferric ions to the seawater, and carbon dioxide gas fixation by phytoplankton can also be anticipated.

The cathode 11 uses platinized titanium or the like. A hydrogen recovery device 14 is provided in the vicinity of the cathode 11 or opposite the cathode 11, and the hydrogen recovery device 14 recovers hydrogen gas generated on the cathode 11 side.

Seawater that flows through the anode 9 side is directed to the first treatment tank 2, and seawater that flows through the cathode 11 side is directed to the second treatment tank 3.

The first treatment tank 2 has a waste concrete input device 15, and concrete that is waste material is inputted into the first treatment tank 2 by the waste concrete input device 15. The inputted waste concrete is preferably pulverized with a large surface area, and removal of aggregate such as sand, rocks and the like is more preferable.

The second treatment tank 3 has a carbon dioxide gas blower 16 which blows carbon dioxide gas separated from the air or carbon dioxide gas emitted from industrial plants into the second treatment tank 3. It is also acceptable to directly blow air into the second treatment tank 3 with the objective of using the carbon dioxide gas contained in the air.

The operations of the present embodiment are described below.

Electrolysis of seawater occurs by applying voltage between the anode 9 and the cathode 11 to cause energization between the anode 9 and cathode 11, and it is primarily the reactions of the following formulas (1) and (2) that occur on the cathode 11 side.

$$H_2O + \tfrac{1}{2}O_2 + 2e^- \rightarrow 2OH^- \tag{1}$$

$$2H_2O + 2e^- \rightarrow 2OH^- + H_2 \tag{2}$$

Figure 2:
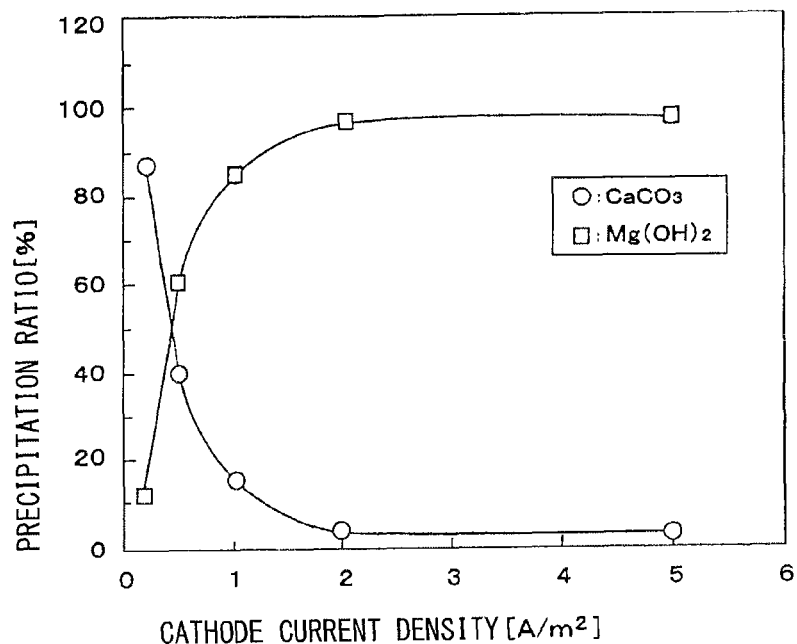
FIG. 2 is a graph which shows the cathode current density and the precipitation ratio of $CaCO_3$ and $Mg(OH)_2$ in the present embodiment.

Accordingly, the pH of seawater on the cathode side (hereinafter referred to as "cathodic electrolyzed water 7b") increases due to generation of $OH^-$ (hydroxy ions), producing $CaCO_3$ and $Mg(OH)_2$, as shown in FIG. 2. In addition, when current-carrying volume per unit area of the cathode 11 is considered as cathode current density Dk ($A/m^2$), the cathode current density Dk and the precipitation ratio of $CaCO_3$ and $Mg(OH)_2$ are as shown in FIG. 2. That is, when the cathode current density Dk increases, the precipitation ratio of $Mg(OH)_2$ increases, and a saturated condition ensues with respect to precipitation of $Mg(OH)_2$ at the point where cathode current density Dk exceeds 2 ($A/m^2$).

Precipitation of $CaCO_3$ gradually decreases and precipitation of $Mg(OH)_2$ gradually increases up to a cathode current density Dk of 2 ($A/m^2$). Consequently, by controlling the cathode current density Dk, it becomes possible to control the precipitation ratio of $CaCO_3$ and $Mg(OH)_2$, or to selectively precipitate $CaCO_3$ and $Mg(OH)_2$.

With actual electrolysis, it is inefficient when the cathode current density Dk is lowered, because the speed of electrolysis slows. Moreover, it is known that when $Mg(OH)_2$ is left standing in the cathodic electrolyzed water 7b after precipitation of $Mg(OH)_2$, a reaction occurs in which $Mg(OH)_2$ is replaced by $CaCO_3$ by the following reaction.

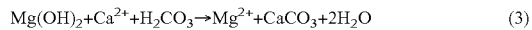

$$Mg(OH)_2 + Ca^{2+} + H_2CO_3 \rightarrow Mg^{2+} + CaCO_3 + 2H_2O \tag{3}$$

Therefore, by setting the cathode current density Dk high, the cathodic electrolyzed water 7b accumulates in the second treatment tank 3 in a state where $Mg(OH)_2$ is precipitated. Carbon dioxide gas is blown into the second treatment tank 3 by the carbon dioxide gas blower 16.

$H_2CO_3$ is produced from $CO_2$ and $H_2O$ by blowing carbon dioxide gas into seawater, and the reaction of the aforementioned formula (3) is induced by this $H_2CO_3$.

As a result, $CaCO_3$ is precipitated, and carbon dioxide gas is fixed in the second treatment tank 3. As $CaCO_3$ is a substance which is stable in an alkaline solution with a pH of 8.5 more, it does not dissolve in the ocean. Moreover, in the case where seawater does not turn acidic, the carbon dioxide gas will not be re-released due to the carbon balance of the atmosphere. Therefore, the cathodic electrolyzed water 7b from which $CaCO_3$ has been removed is discharged from the second treatment tank 3.

Next, in the case where iron is used as the consumable electrode material 13 on the anode 9 side, the following reactions occur, dissolving the iron. Furthermore, ferrous hydroxide occurs and $H^+$ is produced by hydrolysis of ferric ions, thereby lowering the pH of seawater on the anode 9 side (hereinafter referred to as "anodic electrolyzed water 7a").

$$Fe \rightarrow Fe^{2+} + 2e^- \tag{4}$$

$$Fe^{2+} + 2H_2O \rightarrow Fe(OH)_2 + 2H^+ \tag{5}$$

The anodic electrolyzed water 7a which flows into the first treatment tank 2 is turned acidic by $2H^+$. When waste concrete ($Ca(OH)_2$) is inputted into the first treatment tank 2, the acidic seawater is neutralized by the waste concrete according to the following formula.

$$Ca(OH)_2 + 2H^+ \rightarrow Ca^{2+} + 2H_2O \tag{6}$$

In the case where a soluble metal is not used in the anode 9, or when seawater electrolysis is conducted at a high current density, chlorine $Cl_2$ is generated, and HCl and HClO are generated in conjunction with the generation of $Cl_2$. As HCl is strongly acidic, and as HClO is a harmful substance to living creatures, electrolysis is conducted at a current density that inhibits generation thereof to the utmost. However, as stated above, waste concrete ($Ca(OH)_2$) is inputted into the anodic electrolyzed water 7a, whereby the HCl is neutralized by the reaction of:

$$Ca(OH)_2 + 2HCl \rightarrow CaCl_2 + 2H_2O \tag{7}$$

The seawater that has been neutralized and treated in the first treatment tank 2 is then intermixed with the seawater discharged from the second treatment tank 3, and released into the ocean. In this case, the pH of the seawater after intermixture is set to 8.0 by controlling the amount of concrete to be dissolved in the anodic electrolyzed water 7a and the amount of carbon dioxide gas to be blown into the cathodic electrolyzed water 7b.

Therefore, according to the present invention, as carbon dioxide gas fixation treatment can be continuously conducted, and as waste concrete is used in the fixation treatment process, treatment of industrial waste material can be conducted in parallel. Moreover, the fixated $CaCO_3$ is widely present in the natural world as a primary ingredient in seashells and the like, and has little environmental impact even if left as is. As the ferric ions dissolved in the electrolytic process cause propagation of phytoplankton, fixation of carbon dioxide gas is further promoted.

In the process of the aforementioned seawater electrolysis, oxygen gas is generated on the anode 9 side, and hydrogen gas is generated on the cathode 11 side.

The oxygen gas and the hydrogen gas are supplied to a fuel cell that is one type of power-supply unit 12, serving as fuel for power generation.

Figure 3:
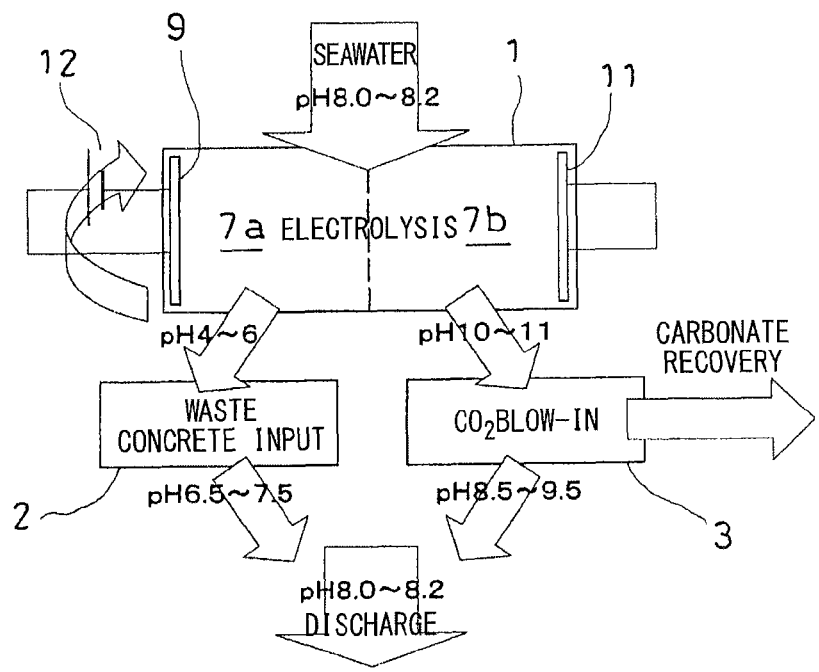
FIG. 3 is a duplex diagram which shows changes in pH in the electrolytic treatment of the present embodiment.

Next, in reference to FIG. 3, an example of pH control of seawater is described in the carbon dioxide gas fixation treatment process by control of the cathode current density Dk. Electrolytic reaction is varied by varying the cathode current density Dk, and electrolytic reaction is promoted by increasing the cathode current density Dk. Therefore, it is possible to control pH on the anode 9 side and the cathode 11 side by controlling the cathode current density Dk.

First, the pH of the cathodic electrolyzed water 7b is set to 10-11, and $Ca^{2+}$ and $Mg^{2+}$ in the seawater are entirely precipitated by electrolysis. At this time, the pH of the anodic electrolyzed water 7a would seem to be on the order of 4-6. In order to increase the dissolution speed of the alkaline components inputted thereafter, a portion of the anodic electrolyzed water 7a that flows out from the outlet 6 is returned to the anode 9 side of the electrolytic treatment container 4, thereby reducing the pH of the anodic electrolyzed water 7a as much as possible.

With respect to the reduction of pH in the second treatment tank 3 by in-blown $CO_2$ for purposes of carbonate recovery, it is suppressed to 8.5-9.5, and carbonate is recovered as $CaCO_3$. Here, in order for the pH of the mixed water from the first treatment tank 2 and the second treatment tank 3 at the time of discharge to be set approximately identical to the pH at the time of inflow, the pH is raised to 6.5-7.5 by inputting the proper amount of alkaline components into the anode electrolyte. Therefore, pH in the case where the anodic electrolyzed water 7a and the cathodic electrolyzed water 7b are intermixed becomes 8.0-8.2. Consequently, the fixation of carbonate can be efficiently conducted while releasing seawater without change to its physical properties.

In the foregoing embodiment, waste concrete is used as the neutralizer of the anodic electrolyzed water 7a, but any neutralizer is acceptable provided that it is waste material having alkalinity, such as the coal ash produced in thermoelectric power plants.

In the foregoing embodiment, seawater electrolysis is conducted while circulating seawater inside the electrolysis tank 1, but it is also acceptable to have a batch system in which on-off valves are respectively provided in the inlet 5 and the outlet 6, seawater electrolysis is conducted in a state where the inlet 5 and the outlet 6 are closed, and the seawater inside the electrolysis tank 1 is replaced after electrolytic treatment.

Figure 4:
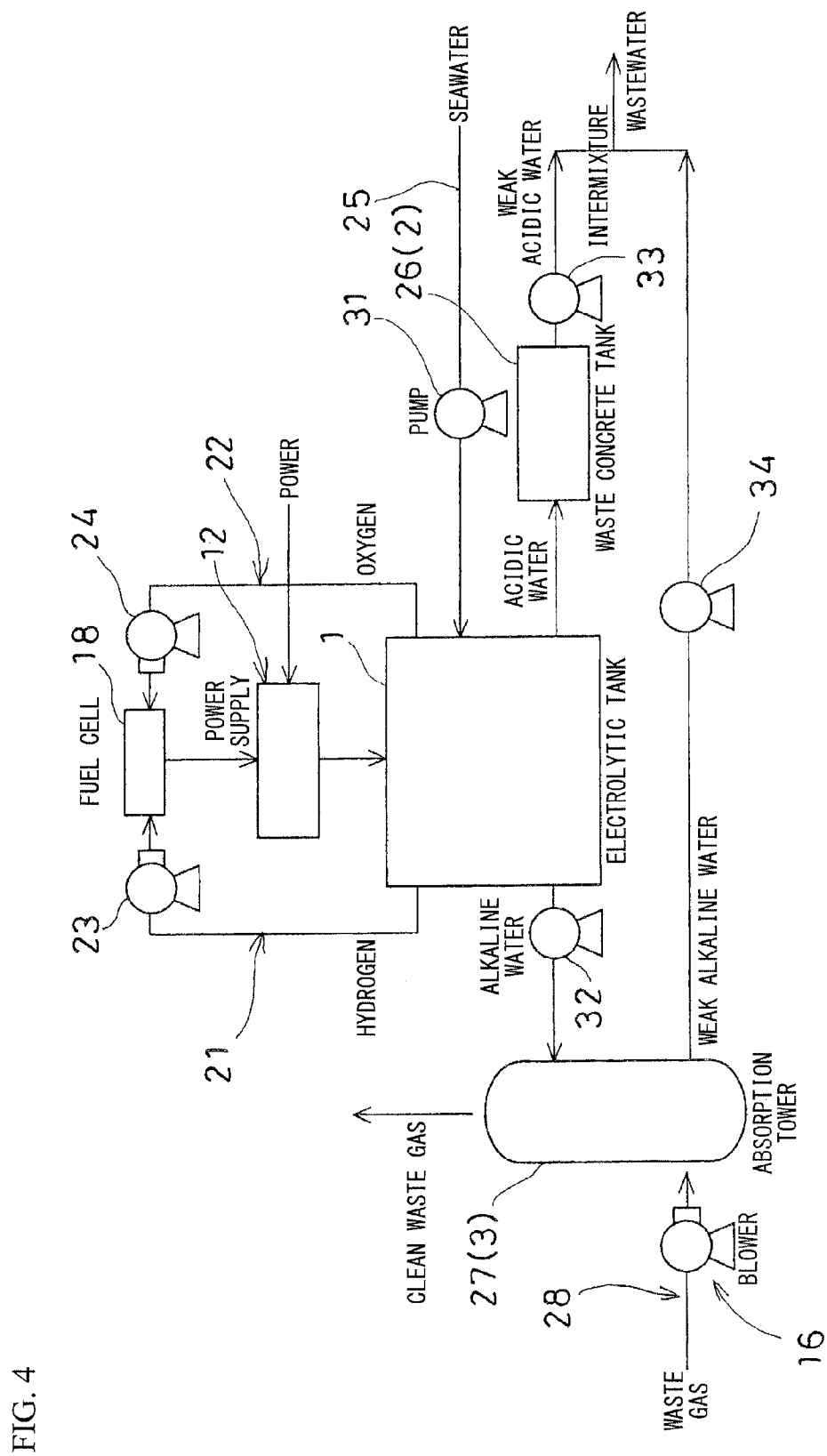
FIG. 4 is a schematic block diagram which shows a carbon dioxide gas fixation apparatus of an embodiment of the present invention.
Figure 5:
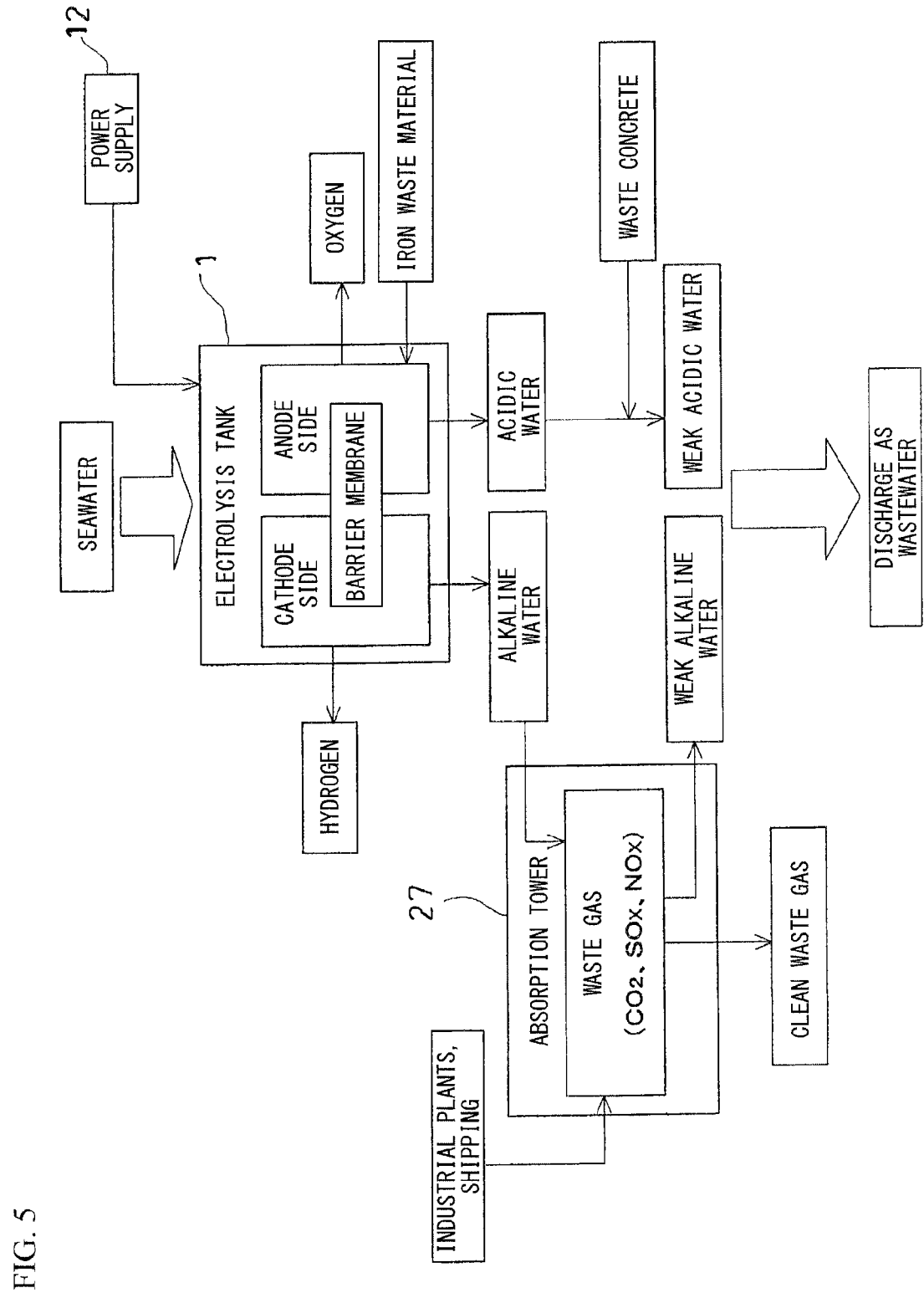
FIG. 5 is a block diagram which shows material balance in the carbon dioxide gas fixation apparatus.

FIG. 4 and FIG. 5 show overviews of a carbon dioxide gas fixation apparatus pertaining to an embodiment of the present invention.

In FIG. 4, components identical to those shown in FIG. 1 are given the same reference symbols. Moreover, in the embodiment shown in FIG. 4, a fuel cell 18 is shown as the power source.

In this apparatus, a hydrogen gas recovery line 21 is provided which recovers hydrogen gas that is generated on the hydrogen recovery device 14 side of the electrolysis tank 1, and which supplies it to the fuel cell 18, and an oxygen gas recovery line 22 is provided which recovers oxygen gas that is generated on the anode 9 side of the electrolysis tank 1, and which supplies it to the fuel cell 18. The hydrogen gas recovery line 21 and the oxygen gas recovery line 22 respectively have gas flow-rate regulation blowers 23 and 24 to regulate the flow rate of the oxygen gas and the hydrogen gas that are supplied to the fuel cell 18.

The power generated by the fuel cell 18 accumulates in the power-supply unit 12, and the supply of accumulated power is controlled so that a prescribed cathode current density Dk is attained in the cathode 11. Power shortfalls in the amount of power generated by the fuel cell 18 are supplemented by power from photovoltaic power generation, wind power generation, or wave power generation, or by power from electric power plants.

A seawater supply line 25, waste concrete tank 26 (equivalent to the first treatment tank 2), and absorption tower 27 (equivalent to the second treatment tank 3) are connected to the electrolysis tank 1, and an exhaust gas supply line 28 (equivalent to the carbon dioxide gas blower 16) is connected to the absorption tower 27.

Acidic water which is the anodic electrolyzed water 7a is supplied to the waste concrete tank 26, waste concrete is inputted into the waste concrete tank 26, pH is adjusted so that the water is weakly acidic, and the adjusted water is discharged.

Alkaline water which is the cathodic electrolyzed water 7b containing $CaCO_3$ and $Mg(OH)_2$ is supplied to the absorption tower 27. Waste gas from various industrial plants such as thermoelectric power plants and chemical plants is introduced into the absorption tower 27. In addition to $CO_2$, this waste gas contains SOx and NOx. After removal of the SOx and NOx in the absorption tower 27, $CO_2$ is supplied to (blown into) the cathode electrolyte. The in-blown $CO_2$ is recovered as $CaCO_3$ (see formula (3)). By blowing in $CO_2$, the partially neutralized cathodic electrolyzed water 7b is discharged from the absorption tower 27 as weakly alkaline water.

After the weakly acidic water that has been discharged from the waste concrete tank 26 and the weakly alkaline water that has been discharged from the absorption tower 27 are intermixed, discharge is conducted from the carbon dioxide gas fixation apparatus into the ocean. The pH of the wastewater is adjusted by the intermixing of weak acidic water and weakly alkaline water, with the result that the pH of the wastewater in the state where it is finally released from the carbon dioxide gas fixation apparatus is identical to the pH of seawater, and there is no impact on the environment.

In FIG. 4, 31 indicates a pump which feeds seawater to the electrolysis tank 1, 32 indicates a pump which feeds the cathodic electrolyzed water 7b to the absorption tower 27, 33 indicates a pump that serves to discharge water from the waste concrete tank 26, and 34 indicates a pump that serves to discharge water from the absorption tower 27.

The present invention can be implemented in a variety of apparatuses and plants that discharge carbon dioxide gas. For example, in the case where the present invention is implemented in marine vessels, as carbon dioxide gas can be removed from exhaust gas, it is possible to conduct marine navigation without discharge of carbon dioxide gas, or with reduced discharge of carbon dioxide gas. In the case where the present invention is provided in a wastewater system of cooling water of a thermoelectric power plant, the pump 31 in FIG. 4 is unnecessary, and as the cooling water that is discharged is high in temperature, electrolytic reaction is promoted, and carbon dioxide gas recovery efficiency is increased.

INDUSTRIAL APPLICABILITY

According to the present invention, it is possible to provide a carbon dioxide gas fixation method and a carbon dioxide gas fixation apparatus which fix carbon dioxide gas with little impact on the environment, and no risk of re-release.

REFERENCE SIGNS LIST

1: electrolysis tank,
2: first treatment tank,
3: second treatment tank,
4: electrolytic treatment container,
5: inlet,
7: seawater,
7a: anodic electrolyzed water,
7b: cathodic electrolyzed water,
8: barrier film,
9: anode,
9a: anode-side region,
11: cathode,
11a: cathode-side region,
12: power-supply unit,
13: consumable electrode material,
14: hydrogen recovery device,
15: waste concrete input device,
16: carbon dioxide gas blower,
18: fuel cell,
21: hydrogen gas recovery line,
22: oxygen gas recovery line, 26: waste concrete tank,
27: absorption tower

The invention claimed is:
1. A carbon dioxide gas fixation apparatus, comprising:
an electrolysis tank which has an anode and a cathode;
a barrier membrane which partitions an interior of the electrolysis tank into an anode-side region containing the anode, and a cathode-side region containing the cathode;
a first treatment tank which stores anodic electrolyzed water produced in the anode-side region;
a second treatment tank which stores cathodic electrolyzed water produced in the cathode-side region;
a power-supply unit which supplies power to the anode and the cathode;
an alkaline material input device which inputs alkaline material into the first treatment tank; and
a carbon dioxide gas blower which blows carbon dioxide gas into the second treatment tank,
wherein wastewater from the first treatment tank and wastewater from the second treatment tank are intermixed, and discharged,
wherein the anode comprises a bucket of reticular or porous plates of an insoluble metal as a consumable electrode storage container and contains iron as a consumable electrode, and the consumable electrode dissolves ferric ions.

2. The carbon dioxide gas fixation apparatus according to claim 1, wherein the power-supply unit has at least one of photovoltaic cell, fuel cell, wind power generator, wave power generator, ocean thermal energy generator, and solar thermal power generator.

3. The carbon dioxide gas fixation apparatus according to claim 1, wherein the power-supply unit contains a fuel cell which uses hydrogen gas generated on the cathode-side region, and oxygen gas generated on the anode-side region.

4. The carbon dioxide gas fixation apparatus according to claim 1, wherein the alkaline material inputted from the alkaline material input device is waste concrete.

* * * * *